United States Patent
Fournier et al.

(10) Patent No.: US 9,892,340 B2
(45) Date of Patent: Feb. 13, 2018

(54) METHOD FOR CLASSIFYING OBJECTS IN AN IMAGING SURVEILLANCE SYSTEM

(75) Inventors: Jerome Fournier, Montigny le Bretonneux (FR); Alain Simon, Les Mesnuls (FR); Etienne Payot, Voisins-le-Bretonneux (FR); Gilles Henaff, Paris (FR)

(73) Assignee: Thales, Courbevoie (FR)

( * ) Notice: Subject to any disclaimer, the term of this patent is extended or adjusted under 35 U.S.C. 154(b) by 903 days.

(21) Appl. No.: 13/518,416

(22) PCT Filed: Dec. 8, 2010

(86) PCT No.: PCT/EP2010/069116
§ 371 (c)(1),
(2), (4) Date: Jun. 22, 2012

(87) PCT Pub. No.: WO2011/076563
PCT Pub. Date: Jun. 30, 2011

(65) Prior Publication Data
US 2012/0274766 A1    Nov. 1, 2012

(30) Foreign Application Priority Data
Dec. 23, 2009   (FR) ..................................... 09 06294

(51) Int. Cl.
*H04N 7/18* (2006.01)
*G06K 9/62* (2006.01)

(52) U.S. Cl.
CPC ................................. *G06K 9/6217* (2013.01)

(58) Field of Classification Search
CPC ........ H04N 7/18; G06K 9/00771; G06K 9/00; G06K 9/6217; G08B 13/196
(Continued)

(56) References Cited

U.S. PATENT DOCUMENTS 7,127,085 B2   10/2006   Kim et al.
7,158,152 B2    1/2007   Jardin et al.
(Continued)

OTHER PUBLICATIONS

Duda R. et al., "Pattern Classification," 2000, pp. 216-433, New York, NY, Wiley-interscience.
(Continued)

*Primary Examiner* — Mehrdad Dastouri
*Assistant Examiner* — Kristin Dobbs
(74) *Attorney, Agent, or Firm* — Baker Hostetler LLP

(57) ABSTRACT

A method for formulating a knowledge database of object images acquired by an imaging device furnished with a sensor, including defining N classes each including a set of objects represented by a label and a set of characteristics, learning decision rules associated with these classes, definition of K contextual information cues regarding image background $f_k$, with k varying from 1 to K and K>1, association of one of these information cues regarding image background $f_k$ with each object, allotting of the objects into M new classes, with N<M≤K×N, each including a set of objects represented by a new label including an old label and one of said information cues regarding image background $f_k$ and the set of characteristics of these objects, definition for each background $f_k$ of a subset $Q_k$ of these M classes associated with this image background, learning of decision rules for each of these subsets $Q_k$.

7 Claims, 4 Drawing Sheets

(58) Field of Classification Search
USPC .......................................................... 348/143
See application file for complete search history.

(56) References Cited

U.S. PATENT DOCUMENTS

| | | | |
|---|---|---|---|
| 7,403,856 B2 | 7/2008 | Moscovitz et al. | |
| 2007/0046448 A1* | 3/2007 | Smitherman | 340/431 |
| 2008/0095435 A1* | 4/2008 | Lipton et al. | 382/173 |

OTHER PUBLICATIONS

Hastie, T. and Tibshirani, R., "Classification by Pairwise Coupling," 1997, pp. 507-513, Conference on Advances in neural information processing systems, The MIT Press, vol. 10.

J. Ponce et al. (Eds.), "Toward Category-Level Object Recognition," 2006, pp. 423-442, LNCS 4170, Springer-Verlag, Berlin, Heidelberg.

A.V. Forman et al.: "Contextual analysis of tactical scenes," Proceedings of the International Society for Optical Engineering (SPIE), SPIR, USA, vol. 845, Jan. 1, 1984, pp. 189-197.

A. Torralba: "Contextual Priming for Object Detection," International Journal of Computer Vision, vol. 53, No. 2, 2003, pp. 169-191.

L. Durieux et al.: "Object-based land cover classification using a preliminary stratified semantic pixel labeling obtained from a fuzzy spectral prior knowledge classifier," ANAIS XIV Simposio Brasileiro de Sensoriamento Remoto, Apr. 23, 2009, pp. 137-143.

G. Heitz et al.: "Learning Spatial Context: Using Stuff to Find Things," Proceedings of the 10th ECCV, Part I—Forsyth D., Torr P. and Zisserman A. (Eds)—LCNS 5320 (Springer)—pp. 30-43, 2008.

A. Bachmann et al.: "Context-Aware Object Priors," International Conference on Intelligent Robotic Systems—IROS 2008—2CD Workshop: Planning, Perception and Navigation for Intelligent Vehicles. Sep. 26, 2008.

A. Torralba et al.: "Sharing visual features for multiclass and multiview object detection," IEEE Transactions on Pattern Analysis and Machine Intelligence, 2006.

P. Viola et al.: "Rapid Object Detection using a Boosted Cascade of Simple Features," IEEE Computer Society Conference on Computer Vision and Pattern Recognition, 2001.

T. Hastie et al.: "Classification by Pairwise Coupling," The Annals of Statistics, 1998, vol. 26, No. 2, pp. 451-471.

C. Li et al.: "Data Association for Infrared Search and Track System," 9th Information Fusion Conference.

E. Binaghi et al.: "Fuzzy Contextual Classification of Multisource Remote Sensing Images," IEEE Transactions on Geoscience and Remote Sensing, vol. 35, No. 2, Mar. 1997, pp. 326-340.

\* cited by examiner (a) Field of view in elevation
(b) Sea background
(c) Land background
(d) Sky backgroung

METHOD FOR CLASSIFYING OBJECTS IN AN IMAGING SURVEILLANCE SYSTEM

CROSS-REFERENCE TO RELATED APPLICATIONS

This application is a National Stage of International patent application PCT/EP2010/069116, filed on Dec. 8, 2010, which claims priority to foreign French patent application No. FR 09 06294, filed on Dec. 23, 2009, the disclosures of each of which are incorporated by reference in their entireties.

FIELD OF THE DISCLOSED SUBJECT MATTER

The field of the invention is that of the classification of objects in imaging-based surveillance systems.

BACKGROUND

The problem posed in this application is that of discrimination between various objects. The variety of objects and backgrounds present in the natural scenes involved is very considerable and it is complex to discern the objects, all the more so since their distance and optionally their radial speed when these objects are mobile, are not known with acquisitions carried out under passive imaging. For example, at long distance, boats may seem very much like airplanes (similar radial speeds, uniform quasi-rectilinear motion, similar intensity levels, etc.). Moreover, the objects of interest must potentially be processed at long distance, these portending low resolutions and therefore an information cue which is not necessarily very rich with regard to taking a classification decision. Furthermore, the picture-taking conditions (weather conditions, day/night conditions, reflections, dazzle, etc.) modify the signal on these objects, further complicating the discrimination task.

Classification techniques operate by representing the objects by a set of characteristics (speed, SNR, intensity, shape signatures, etc.). The latter define one or more multidimensional spaces of characteristics into which are projected the characteristics extracted from the objects, thus forming "clouds of points" or classes whose boundaries need to be found. These boundaries are "learnt" on the basis of a set of reference objects also called the learning set, whose real type we know (that is to say the nature of the classes is known a priori and without ambiguity). The better the characteristics and the more separated the clouds of points formed by the various classes of interest, the more discriminating are the boundaries found. Likewise, the greater the variety of the objects and the more considerable the number of classes, the more complex it is to properly characterize them and therefore to discriminate them. The rules making it possible to decide an object's membership or otherwise of a class, arise from the learning.

A computer program whose role is to decide to which class a new object provided as input belongs, as a function of the information cues learnt, is called a classifier (or expert). The membership class is determined by applying the decision rules (otherwise called knowledge database) which have themselves been previously learnt on the learning data.

The classification of a new object therefore assumes that the decision rules have previously been formulated.

The formulation of this knowledge database is considered firstly. It is based on a set of known examples called prototypes. The prototypes are often represented by vectors of characteristics where each component is a measurement made on the real objects or on one of their qualitative attributes. Each characteristic therefore becomes an axis in a space whose dimension is equal to the cardinality of the set of characteristics. A prototype is a point projected into this space and this series of measurements, or the set of characteristics of a prototype, forms a representation of the real object and constitutes its signature. The difficulty here is to find "good" characteristics which subsequently allow the classifier to easily recognize the various classes of objects: they are then said to be discriminating.

The learning phase consists in splitting (or separating) the representation space by virtue of boundaries and in assigning class labels to the regions thus formed. The formulation of the knowledge database (or the learning of the classifiers) therefore consists in searching for these decision boundaries. The region where a vector of characteristics is situated determines its membership class.

There exist several schemes for defining a certain number of rules indicating membership or otherwise in a class. These schemes can be decomposed into two large families, one using a so-called structural approach and the other a statistical approach.

The structural approach utilizes the topology of the elementary structures of the objects (the shape is described in the form of elementary structures and of relations between these structures) to define these rules; for example, in syntax recognition, a word is represented by letters arranged in a precise order. Thus, decision trees, expert systems and syntax analysis programs form part of this category of schemes.

Generally, it is not possible to build a perfect partition of space as illustrated in the example of FIG. 1. The three classes of objects, respectively labeled "et1", "et2" and "et3", which are represented with the aid of two characteristics, speed and intensity of the object, are clearly delimited by the three boundaries "boundary1", "boundary2" and "boundary3". According to a statistical approach, the decision boundaries are learnt with the help of the learning set (or database) presumed to be statistically representative of the real distribution of the classes; hence the major role played by the reference objects of this database. This approach is based on characteristics having the form of a vector of numerical (generally real) values.

The definition of these membership rules results, as will be seen, from a certain compromise.

An object or an observation to be classed (during a subsequent step, the knowledge database having been established previously), therefore becomes a point in the space of characteristics. The knowledge of the spatial distribution of the classes makes it possible theoretically to categorize and therefore to instantaneously recognize the objects thus represented. The boundaries separating the classes in the space of characteristics, called decision boundaries and which ensue from these membership rules, must therefore be the result of a certain compromise between the capacity for generalization and that for memorization. The term generalization is understood to mean the capacity of a classifier to correctly recognize new observations, whereas memorization is its capacity to properly class the examples which served it for learning. The learning of the statistical classifiers is therefore a search for these decision boundaries.

There exist several types of characteristics relating to:
  local description: numerous algorithms have been proposed for developing descriptors that are invariant to changes of scale and to affine transformations;

description of shape: if the radiometric information cue is significant, many objects or classes of objects are characterized by their shape. Taking, for example, the class of humans, it is impossible to make do with information cues regarding gray levels and it is necessary to describe the shape of the silhouettes. For example, this shape can be described with the help of the 2D spatial derivatives, of the 2D contours or even of the 3D shape.

description of texture: the description of the texture is combined with non-supervised classification algorithms or in a more general manner with algorithms which describe data distributions. It is then possible to obtain an appropriate texture description which is discriminating and invariant to image transformations. The use of a large quantity of learning images makes it possible to model real textures such as, for example grass and foliage and therefore to model certain types of images, such as for example natural outdoor scenes.

The characteristics are generally based on local measurements made on the object to be recognized. Texture descriptors or schemes of the "bag of words" type (J. Ponce, M. Hebert, C. Schmid, and A. Zisserman (eds.), Toward Category-Level Object Recognition, Springer-Verlag, Lecture Notes in Computer Science, Vol. 4170. In press) allow context to be taken into account to some extent, however these approaches are often expensive.

The classes, their labels and the rules of membership in these classes having been established, the step of classifying a new object in one of these classes is now considered; this is a multi-class classification problem. A high number of classes renders these problems difficult to solve and gives rise to high computational complexity.

There exist statistical approaches for solving multi-class problems. Two families of schemes are distinguished:

the conventional schemes such as the K nearest neighbors or neural networks which consider all the classes at once; these are multi-class schemes, the other schemes combine binary classifiers with "one against all" or "one against one" strategies, examples of which are described respectively in the publications "Duda, R., Hart, P., & Stork, D. (2000). Pattern Classification. New York, N.Y.: Wiley-interscience" and "Hastie, T. & Tibshirani, R. (1998). "Classification by pairwise coupling," 1997 Conf. On Advances in neural information processing systems, The MIT Press, Vol. 10, 507-513".

In the "one against all" strategy, the similarity between the various classes is not taken into account. There is therefore no guarantee as regards the existence of a discrimination between the classes. This poses a genuine problem of performance of the classification module. The "one against one" strategy exhaustively decomposes a problem with Q classes into a problem with $C_Q^2$ classes. Such a strategy considerably increases the number of classes as well as the computation times.

In order to improve the separation of the classes and the readability of the classification problem, the structural approach based on a decision tree may be relevant. However, the construction of these trees is difficult both at the level of the choice of the attributes to be used for each node of the tree, and at the level of the depth of the tree. Moreover, even if such a structure is comprehensible to a human, it does not guarantee good discrimination.

Mixed approaches, combining decision trees and statistical approaches, have recently appeared in the state of the art and propose a cascade of boosted classifiers; it is possible to cite "Viola & Jones (2001) Rapid object detection using a boosted cascade of simple features. In IEEE Computer Society Conference on Computer Vision and Pattern Recognition". The advantage of such schemes is mainly that of minimizing the computation time spent on the simple cases and of devoting more processing time to the difficult cases. These approaches are used for binary classification applications (face or pedestrian detection). However, work has been carried out to extend these algorithms to multi-class classification problems. The major drawback of these techniques is the difficulty in comprehending and interpreting the manner in which these algorithms operate.

In the field of teledetection where one seeks to recognize the nature of the natural coverage of the observed scene, there exist applications using a Digital Terrain Model (or DTM) coupled with a classification (supervised or non-supervised). One seeks in this case to recognize the type of natural coverage of the scene (glacier, lake, forest, field, etc.) and not objects of interest in the scene.

In the field of imaging-based surveillance, schemes for classifying targets are little described. The majority of the approaches presented are based on tracking-evolution models and belief functions. When the discrimination task is difficult, the computation time/performance compromise is difficult to obtain.

SUMMARY

The aim of the invention is to alleviate these drawbacks.

The principle of the invention consists in subdividing the global classification problem into different sub-problems corresponding to the various types of backgrounds to which the objects belong.

Accordingly, the type of background to which the object belongs, for example sea background, land background, sky background, crest line or horizon line, is used as new characteristic of the object. This information cue is computed by virtue of the use of a Digital Terrain Model (DTM), of the knowledge of the navigation information cues (geographical and attitude positions of the sensor of the imager system) and of the spatial direction from which the object is viewed.

For a zone of interest centered on the system, the elevations of the terrain are determined initially and the coast lines and crest lines are projected into the field of view, thereby making it possible to segment the field of view as specified hereinabove. It is noted that, when the platform moves and/or the sensor is subjected to attitude variations, the field of view of the sensor is, over time, wider than its instantaneous field of view. The field in which the computation is carried out, in particular in elevation, takes account of this fact.

By way of this new characteristic, it is possible to position an object on a particular background type and to apply suitable decision rules to it based on specific knowledge of this background. Stated otherwise, for a particular background type, the variety of the objects is reduced with respect to the global problem, the characterization of the data becomes less complex and the discrimination becomes better, the ambiguities between objects being reduced to the objects belonging to common backgrounds.

More precisely, the subject of the invention is a method for formulating a knowledge database of object images obtained by an imaging device furnished with a sensor, which comprises a step of defining N classes each comprising a set of objects represented by a label and a set of characteristics, and a step of learning decision rules associated with these classes. It is mainly characterized in that it furthermore comprises the following steps:

definition of K contextual information cues regarding image background $f_k$, with k varying from 1 to K and K>1, association of one of these information cues regarding image background $f_k$ with each object, allotting of the objects into M new classes, with N<M≤K× N, each comprising a set of objects represented by a new label including an old label and one of said information cues regarding image background $f_k$ and the set of characteristics of these objects, definition for each background $f_k$ of a subset $Q_k$ of these M classes associated with this image background, learning of decision rules for each of these subsets $Q_k$.

According to a characteristic of the invention, since the image backgrounds are backgrounds determined without ambiguity, the information cues regarding image background $f_k$ relate furthermore to information cues regarding boundary zones between two of said backgrounds determined without ambiguity, the width of these boundary zones being determined as a function of predetermined errors in the DTM and/or the position of the sensor and/or its attitude.

An operator will decide to segment the problem into several sub-problems pertaining to various backgrounds (e.g.: land/sea). Nonetheless, the computation of the information cue regarding membership in such and such a type of background (binary or probabilistic membership) is either fixed by an operator or else computed automatically using the DTM.

The subject of the invention is also a method for classifying an object present in an image obtained by an imaging-based surveillance system, which comprises a step of extracting the object to be classified in the image, characterized in that it comprises a step of classifying the object with the help of a knowledge database such as previously described, which comprises the following sub-steps:

acquisition by positioning means of the system, of the geographical position of the sensor of the imaging device during the acquisition of the image, supplying of the surveillance system via a Digital Terrain Model and extraction from the DTM of a region of interest associated with this position, estimation of the attitude of the sensor of the imaging device during the acquisition of the image, by attitude measurement means, these measurements advantageously being filtered, determination of the elevations of the terrain on a domain compatible with the field of view of the imaging device, as a function of said attitude and of said region of interest, projection into the field of view of the sensor of the background contextual information cues so as to segment the field of view, determination of the background $f_k$ associated with the object to be classified, application of decision rules for deciding the subset associated with this background, these rules arising from the method, such as described previously, for formulating a knowledge database.

When the DTM does not provide any terrain elevation information cues for certain positions of the sensor (in zones covered by water for example), the step of extraction from the DTM of a region of interest comprises a prior step for supplementing said DTM with terrain elevation information cues associated with these positions (zero altitudes or minimum or mean values of the adjacent zones).

Finally, the invention relates to an imaging-based surveillance system which comprises an imaging device furnished with a sensor, means for positioning the imaging device, storage means on which are stored files of a Digital Terrain Model and a processing unit which comprises means for implementing the classification method such as described previously.

The proposed solution makes it possible to improve the performance of the system by reducing the complexity of the task of discriminating between the various types of targets and by allowing adaptation of the classification process to suit the current geographical environment of the system.

Moreover, the interpretation of possible problems or errors of classification, and consequently the search for solutions to these problems, is facilitated by reducing the compass of the problem: the analysis is done for one type of background only.

Finally, the advantage of the scheme is to allow an improvement in computation time. Indeed, with respect to a global approach (that is to say an approach using a learning database embracing all the types of objects and characterization by a considerable number of attributes), the size of the learning database and the number of characteristics required for decision-taking are reduced.

BRIEF DESCRIPTION OF THE DRAWINGS

Other characteristics and advantages of the invention will become apparent on reading the detailed description which follows, given by way of nonlimiting example and with reference to the appended drawings in which.

DETAILED DESCRIPTION

Across the figures, the same elements are tagged by the same references.

Figure 1:
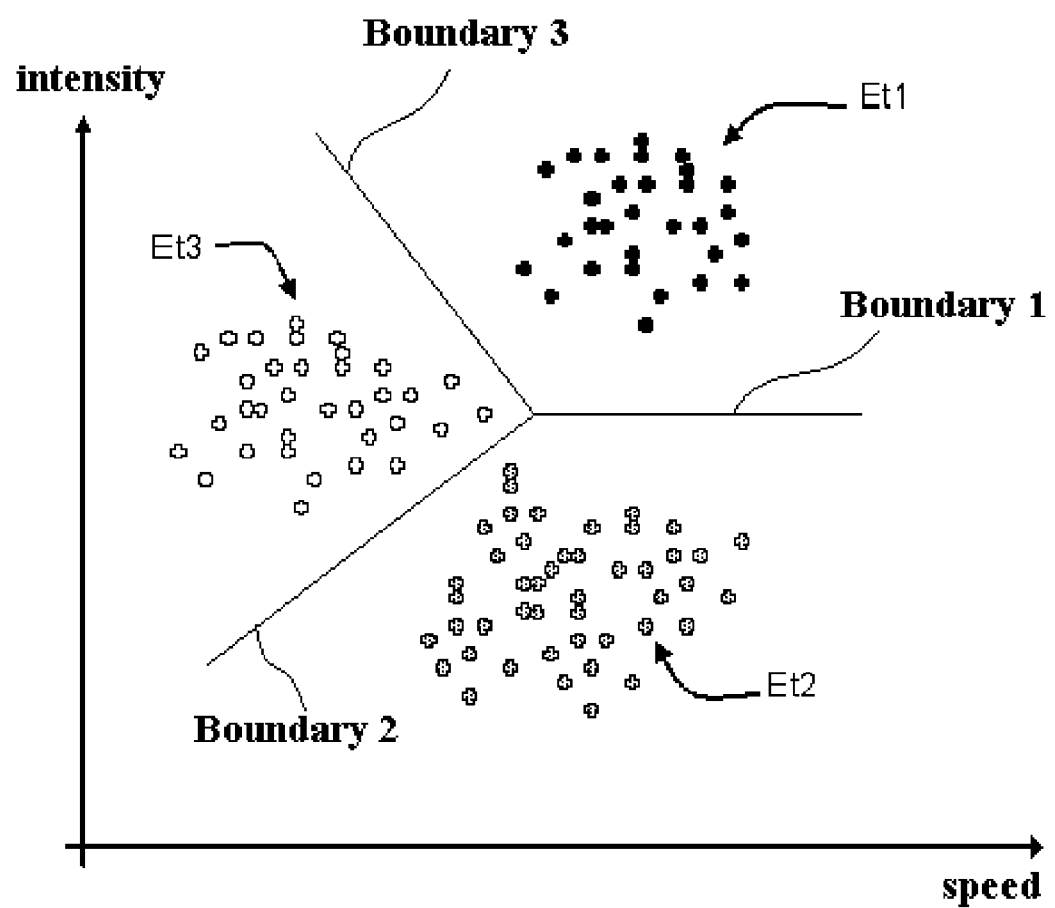
FIG. 1 schematically represents an example of three classes perfectly allotted in a two-dimensional space, FIG. 2 schematically illustrates an example according to the invention of allotting three original classes (N=3) into six new classes (M=6) obtained by allotting the objects of each of the three original classes according to a sky background and a sea background, FIGS. 3a and 3b schematically represent examples of terrain elevation (FIG. 3a) and of intervisibility map (FIG. 3b), FIG. 4 schematically represents an exemplary imaging-based surveillance system equipped with classification means according to the invention.
Figure 2:
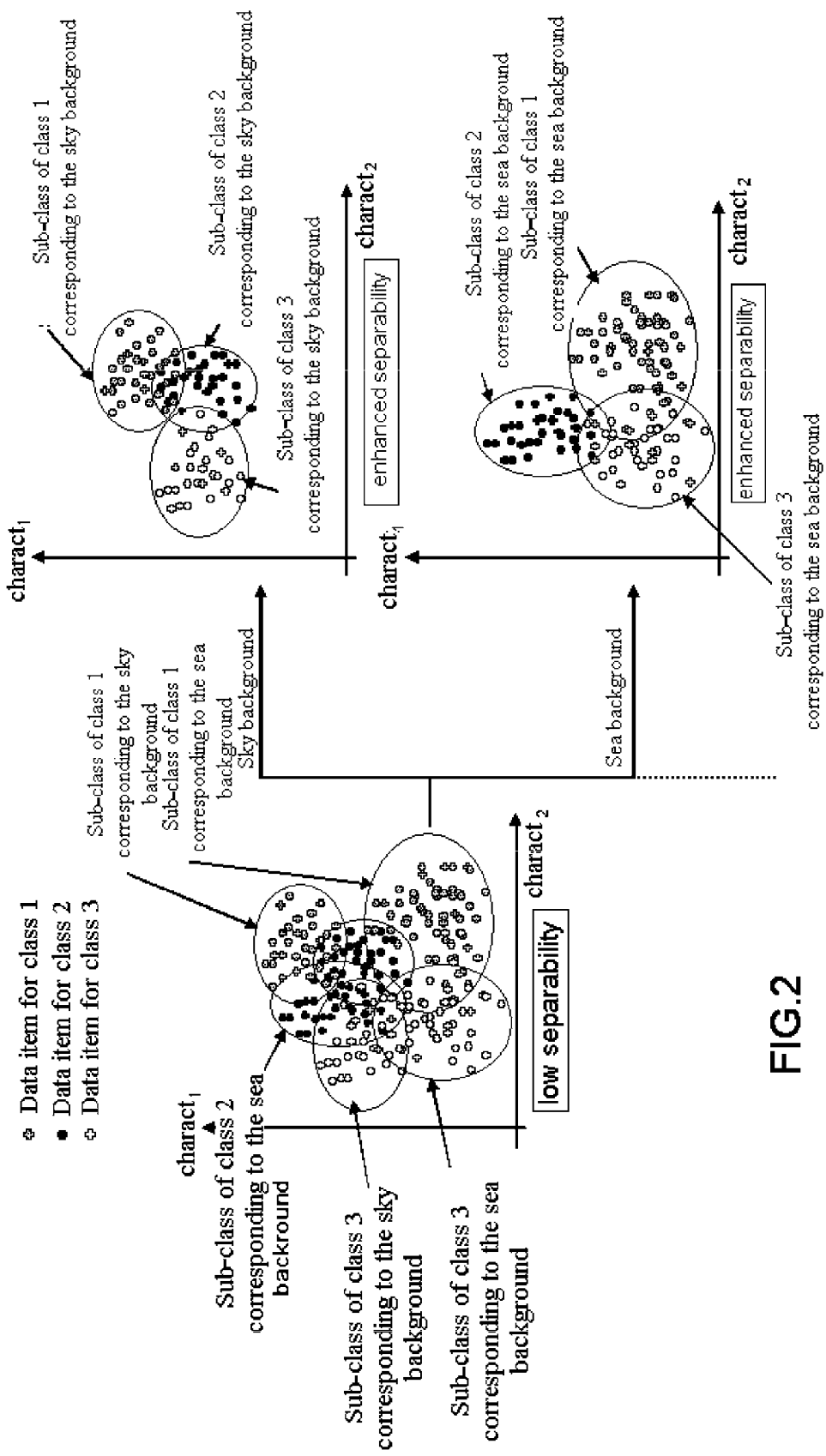

The method according to the invention will be described in conjunction with the example of FIG. 2.

N classes (in the example N=3) are defined, each comprising a set of reference objects represented by a label (class1, class2 and class3). These classes typically exhibit low separability. With these classes are associated a set of characteristics (in the example charact1, charact2), and of decision rules associated with these characteristics.

The following step consists in defining K (K>1) contextual characteristics, in this instance characteristics regarding image background $f_k$, with k varying from 1 to K; the example of the figure involves a sea background $f_1$, and a sky background $f_2$ (K=2).

A context characteristic $f_k$ is then associated with each object of each of the N classes; this is performed either by an operator, or computed automatically using the DTM. A boat object is for example associated with the sea background but is not associated with the sky background and vice versa an airplane is associated with the sky background but is not associated with the sea background. Several context characteristics $f_k$ may be associated with one and the same object. On account of its erratic motion, a bird may switch successively over a short time span from a sea background type to a sky background type, this not being the case for an airplane.

It is also possible to define as information cues regarding background $f_k$, information cues regarding boundary zones between two backgrounds determined without ambiguity, the width of these boundary zones being determined as a function of predetermined errors in the DTM and/or the position of the sensor and/or its attitude.

With the help of these characteristics $f_k$ and of the N original classes, M new classes are then defined with $N<M\leq K\times N$. Each original class is thus split into sub-classes with the help of the contextual information cue regarding background $f_k$. There are at most K sub-classes for each original class. It is possible to have $M=K\times N$ as in the figure where the objects of the three original classes are allotted into 6 (we have $M=K\times N=2\times 3$) new classes: three new classes for the sky background and three new classes for the sea background. But it is also possible to have $M<K\times N$ when none of the objects of one of the N original classes is associated with one or more of the context characteristics.

This allotting may be carried out by an operator or by automatic learning or optionally both.

Thus, M (in our example $M=6$ with $K=2$ and $N=3$) new classes are defined, in which the objects of the three original classes are allotted as a function of the old context characteristics and of the new context characteristics. Each new class is represented by a new label including an old label and one of said information cues regarding image background and the set of characteristics of these objects.

For each background $f_k$ is defined a subset $Q_k$ of these M classes associated with this image background. In our example, two subsets $Q_1$ and $Q_2$ of 3 classes are defined, one for the sea background $f_1$, the other for the sky background $f_2$. A subset $Q_k$ may be empty when, for example, no object of an original class is associated with the image background $f_k$: no boat object is associated with the sky background for example.

Decision rules are established in a conventional manner for each of these subsets $Q_k$.

A new knowledge database is thus defined.

This solution makes it possible to improve the performance of the classification system by reducing the complexity of the task of discriminating between the various types of targets and by allowing adaptation of the classification process to suit the current geographical environment of the system.

Moreover, the interpretation of possible problems or errors of classification, and consequently the search for solutions to these problems, is facilitated by reducing the compass of the problem: the analysis is done for one type of background only.

Finally, the advantage of the method is to allow an improvement in computation time. Indeed, with respect to a global approach (that is to say an approach using a learning database embracing all the types of objects and characterization by a considerable number of attributes), the size of the learning database and the number of characteristics required for decision-taking are reduced.

To this new learning database of M classes there corresponds a new method for classifying a new object.

It comprises notably a step consisting in associating a background information cue $f_k$ with the new object. An object may belong in a definite manner to a single type of background or else may be situated in an ambiguous boundary zone. To take these ambiguous zones into consideration, it is possible either to choose to define the boundary zones such as "crest line" and "horizon line" as new information cues regarding background $f_k$ and to associate the object with a single background information cue. According to an alternative, it is possible not to supplement these background information cues with these boundary zones and to associate the object simultaneously with two information cues regarding background $f_k$.

Thus, for example the kinematics of the two objects:
airplane, boat may be very close just like their intensities, hence a risk of confusion; but if the object to be classified is not too close to the horizon, it will be associated with a "sky" or "sea" background characteristic, and steered toward classes in which there is no airplane/boat ambiguity: in the "sky" classes, airplanes cannot be confused with boats and conversely in the "sea" classes, boats cannot be confused with airplanes;
airplane, wave crest may be very close just like their intensities, hence a risk of confusion; in the "sky" classes, airplanes cannot be confused with wave crests and conversely in the "sea" classes, waves cannot be confused with airplanes;
boat, edge of clouds may be very close just like their intensities, hence a risk of confusion; in the "sky" classes, cloud edges cannot be confused with boats and conversely in the "sea" classes, boats cannot be confused with cloud edges.

Figure 3A:
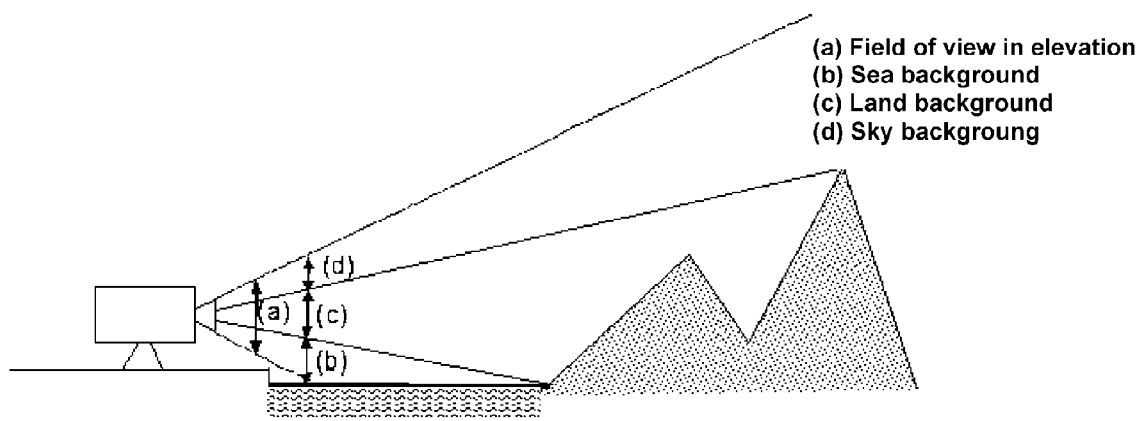
Figure 3B:
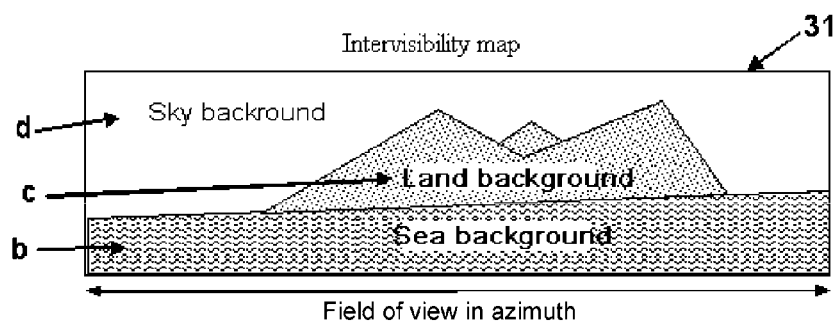

The background information cue $f_k$ associated with the new object is computed with the help of the geographical position and the attitude of the imaging device of the surveillance system and by virtue of the use of a Digital Terrain Model (DTM). For a zone of interest centered on the position and the direction of the line of sight of the imaging device, the elevations of the terrain are initially determined, as illustrated in FIG. 3a. The elevations of the terrain may exit the field of view of the sensor and even of the field in which the information cue is computed—itself greater (at least in elevation) than the extension of the sensor. Next, the background contextual information cues previously assembled in intervisibility maps 31 on which the coast lines and crest lines are represented, as illustrated in FIG. 3b, are projected into the field of view of the imaging device, thereby making it possible to segment the field of view as specified hereinabove, that is to say as a function of the background contextual information cues.

By way of this new characteristic $f_k$, the objective is to position an object on a particular background type and to apply to it the suitable decision rules defined during the formulation of the new knowledge database.

The classification of a new object is generally delayed from the formulation of the knowledge database. In the case for example of a surveillance system loaded aboard an aircraft, the knowledge database is formulated on land, the classification method being implemented in flight. The knowledge database is produced on land before the mission and the decision-taking is implemented in the course of the mission.

Figure 4:
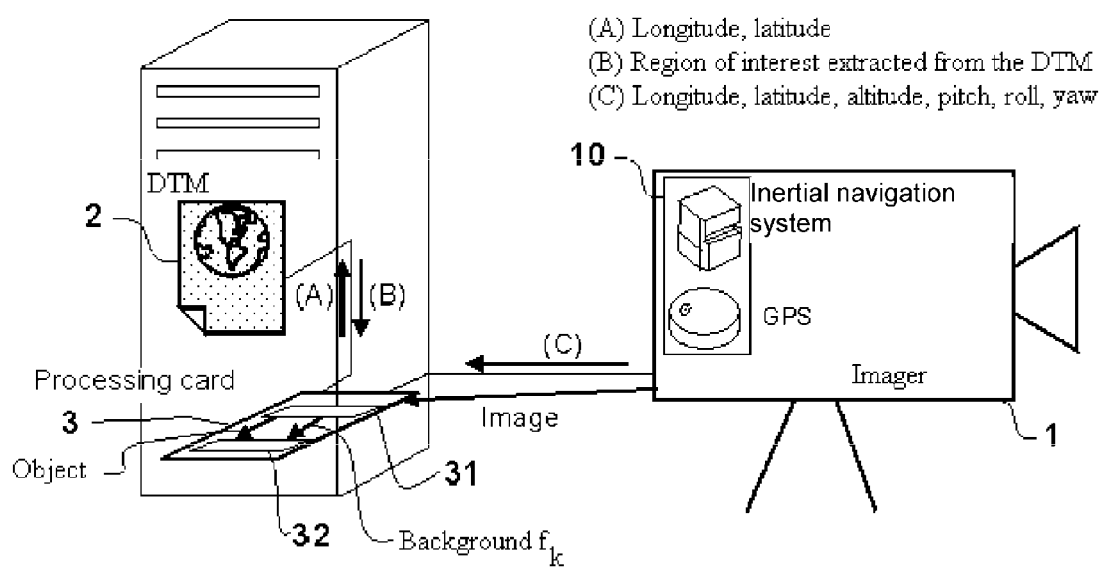

The imaging-based surveillance system 100 described in conjunction with FIG. 4, which is equipped with a classification device (or classifier), comprises:
positioning means 10 such as an inertial navigation system (INS) and a GPS, integral with the imaging device 1 (optionally a passive imaging device) serving to determine the angular orientations of the objects extracted from the images and to position the sensor according to its geodesic coordinates. It is advantageously appropriate to ascertain the errors in these information cues so as to be able to weight the confidence in the membership results to be produced.

A Digital Terrain Model 2 including the geographical zone covered by the surveillance system. If the system is required to be loaded aboard a carrier in motion, it is appropriate to deploy on hard disk DTMs of all the zones in which the system has to operate.

A processing unit 3 integrating a microprocessor and loaded with software charged with processing the data of the DTM and of the inertial navigation system so as to position the various objects to be classified on the various types of backgrounds and thus implement the method for classifying a new object which will be described further on. Certain parts of the processing can optionally be embedded on FPGA.

The scheme can be adapted to suit the precision of measurement of the inertial sensors and of the level of precision of the Digital Terrain Model. The principle is not called into question as they evolve, an increase in precision of these elements allowing, after simple re-parametrization, a gain in terms of precision of segmentation of the field of view.

The method for classifying a new object operates as follows:

1. The inertial navigation system 10 measures the following inertial data C at the level of the imaging device 1 and transfers them to the processing unit 3: longitude, latitude, altitude, pitch, roll and yaw. If they are not known a priori and fixed in the processing unit, the inertial navigation system can also provide the values of the uncertainties in the above measurements.
2. The processing unit 3 receives the inertial data C, extracts the longitude and the latitude A; according to a variant, the processing unit directly receives a geographical position A from the positioning means 10 such as a GPS. With the help of this position A, a zone of interest B (geographical zone centered on the system) is determined and the altitude data corresponding to the zone of interest B are then extracted from the files of the Digital Terrain Module 2, stored in the storage means (hard disk typically). Preferably, when there are no altitude data for certain zones of interest B, such as zones covered by water, the processing unit 3 determines artificially for these zones, altitude data by 0 values or by the minimum or mean values of the adjacent zones.
3. The processing unit 3 extracts the sensor altitude datum from the inertial data C and uses it jointly with the zone of interest B to construct, by projection, an intervisibility map 31 (for each observed direction, this map provides the type of background visible) for the whole of the field of view. This intervisibility map 31 is illustrated in FIG. 3b.
4. The processing unit 3 extracts the roll, pitch and yaw data from the inertial data C and uses them jointly with the altitude of the sensor to reference the objects in the same angular coordinate frame as the intervisibility map 31.
5. The processing unit 3 deduces therefrom the type of background $f_k$ to which the object undergoing classification belongs, and, as a function of the latter information cue, applies to it the decision rules of the classifier 32 applying to this type of background and defined during the formulation of the new knowledge database.

The frequency of the operations 1, 2, 3, on the one hand, and of the operations 4, 5, on the other hand, can differ according to the needs of the application (carriers in motion, frequencies of the classification requests, etc.). A typical need is a low temporal frequency for operations 1, 2, 3 (sufficient when the carrier motion is slow) and a high temporal frequency for operations 4, 5 (the number of objects to be classified is generally large and the decision-taking times must be short).

The invention claimed is:

1. A method for classifying an object present in an image acquired by an imaging-based surveillance system having a sensor, the method comprising:
   extracting the object to be classified in the image;
   classifying the object with help of a knowledge database, said knowledge database comprising originally an N number of classes, N being a positive integer, each class comprising a set of reference objects and a set of reference characteristics, arising from a processing supplied by a Digital Terrain Model (DTM), and comprising decision rules associated with these background scene types;
   defining K contextual characteristics including one or more background scene types, K>1; and
   forming an M number of new sub-classes in the knowledge database such that N<M≤K×N, each sub-class comprising a sub-set of objects represented by a new label,
   wherein the classifying includes:
      associating a background scene type to the object, the associating comprising:
         acquiring by positioning means of the system, a geographical position of the sensor during acquisition of the image,
         supplying, to the surveillance system via the DTM, extraction from the DTM of a region of interest associated with the geographical position,
         estimating an attitude measurement of the sensor during acquisition of the image, by attitude measurement means,
         determining elevations of terrain on a domain compatible with a field of view of the imaging-based surveillance system, as a function of said attitude and of said region of interest,
         projecting into the field of view a segmentation of the field of view with help of elevations of the terrain,
         determining, with help of segmentation of the field of view and of the geographical position of the object in the field of view, the background scene type associated with the object to be classified,
         applying to the object to be classified the decision rules associated with the background scene type, and
      wherein said classifying is carried out based upon the applying step within the M sub-classes.

2. The method for classifying an object of claim 1, wherein the attitude measurements are filtered.

3. The method for classifying an object of claim 1, wherein
   the DTM does not provide any information cues for certain positions of the sensor, and
   the extraction from the DTM of the region of interest comprises a prior step for supplementing said DTM with zero altitudes or minimum or mean values of adjacent zones associated with these positions.

4. The method for classifying an object of claim 1, wherein information cues regarding backgrounds correspond to boundary zones determined as a function of predetermined errors in the DTM or the position of the sensor or its attitude.

5. An imaging-based surveillance system comprising:
an imaging device furnished with a sensor;
positioning means for the imaging device;
storage means configured to store files of a Digital Terrain Model; and
a processing unit comprising means for implementing the method as claimed in claim 1.

6. The method for classifying an object of claim 1, further comprising:
forming a new learning database having M sub-classes such that a computational time to classify the object into the M sub-classes is less than a computational time to classify the object into the original N number of classes.

7. A method for classifying an object present in an image acquired by an imaging-based surveillance system having a sensor, the method comprising:
extracting the object to be classified in the image;
classifying the object with help of a knowledge database, said knowledge database comprising originally an N number of classes, N being a positive integer, each class comprising a set of reference objects and a set of reference characteristics, arising from a processing supplied by a Digital Terrain Model (DTM), and comprising decision rules;
defining K contextual characteristics including one or more background scene types, K>1;
forming an M number of new sub-classes in the knowledge database such that N<M≤K×N, each sub-class comprising a sub-set of objects associated to a background scene type; and
for each background scene type, learning of suitable decision rules for said sub-classes associated to said each background scene type;
wherein the classifying includes:
associating a background scene type to the object, the associating comprising:
acquiring by positioning means of the system, a geographical position of the sensor during acquisition of the image;
supplying, to the surveillance system via the DTM, extraction from the DTM of a region of interest associated with the geographical position;
estimating an attitude measurement of the sensor during acquisition of the image, by attitude measurement means;
determining elevations of terrain on a domain compatible with a field of view of the imaging-based surveillance system, as a function of said attitude and of said region of interest;
projecting into the field of view a segmentation of the field of view with help of elevations of the terrain;
determining, with help of segmentation of the field of view and of the geographical position of the object in the field of view, the background scene type associated with the object to be classified;
determining the sub-classes associated to said determined background scene type associated with the object to be classified, and applying the suitable decision rules associated with said determined sub-classes to the object to be classified.

* * * * *